(12) United States Patent (10) Patent No.: US 7,971,074 B2
Liu et al. (45) Date of Patent: Jun. 28, 2011

(54) METHOD, SYSTEM, AND APPARATUS FOR A CORE ACTIVITY DETECTOR TO FACILITATE DYNAMIC POWER MANAGEMENT IN A DISTRIBUTED SYSTEM

(75) Inventors: Yen-Cheng Liu, Portland, OR (US); Steven R. Hutsell, Banks, OR (US); Krishnakanth Sistla, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 11/770,618

(22) Filed: Jun. 28, 2007

(65) Prior Publication Data

US 2009/0006871 A1 Jan. 1, 2009

(51) Int. Cl.
*G06F 1/32* (2006.01)
(52) U.S. Cl. .................... 713/300; 713/320; 713/323
(58) Field of Classification Search ................ 713/300, 713/320, 322, 323, 324
See application file for complete search history.

(56) References Cited

U.S. PATENT DOCUMENTS

| 5,864,702 | A | 1/1999 | Walsh et al. |
| 6,009,488 | A | 12/1999 | Kavipurapu |
| 7,325,050 | B2 * | 1/2008 | O'Connor et al. ............ 709/223 |
| 2003/0140284 | A1 * | 7/2003 | Dettinger et al. .............. 714/48 |
| 2004/0163000 | A1 * | 8/2004 | Kuhlmann et al. ........... 713/300 |
| 2005/0027863 | A1 | 2/2005 | Talwar et al. |
| 2006/0136761 | A1 | 6/2006 | Frasier et al. |

OTHER PUBLICATIONS

"International Search Report/Written Opinion for PCT Patent Application No. (PCT/US2008/067201), mailed (Aug. 29, 2008), (11) Pages."
International Preliminary Report on Patentability received for PCT Application No. PCT/US2008/067201, mailed on Jan. 14, 2010, 8 pages.
Foreign Office Action received for Japanese patent application No. 2008-169162, mailed Sep. 28, 2010, 5 pages of English translation and 5 pages of Japanese office action.

* cited by examiner

*Primary Examiner* — Chun Cao
*Assistant Examiner* — Paul B Yanchus, III
(74) *Attorney, Agent, or Firm* — Caven & Aghevli LLC

(57) ABSTRACT

A system and method to provide source controlled dynamic power management. An activity detector in a source determines expected future resource usage. Based on that expected usage, the source generates a power management command and sends that command to a destination. The destination then adjusts the power level of the resource based in the command.

19 Claims, 6 Drawing Sheets

METHOD, SYSTEM, AND APPARATUS FOR A CORE ACTIVITY DETECTOR TO FACILITATE DYNAMIC POWER MANAGEMENT IN A DISTRIBUTED SYSTEM

BACKGROUND OF THE INVENTION

1. Field

Embodiments of the invention relate to power management. More specifically, embodiments relate to source controlled dynamic power management.

2. Background

Microprocessors commonly use dynamic power management techniques to manage power usage. Normally, dynamic power management for microprocessors is accomplished through activity detector circuitry that is located in the microprocessor and coupled to a centralized, front side bus (FSB). The activity detector circuitry is adapted to detect conditions under which certain units should be turned on or off and to adjust the power levels of these units appropriately.

Traditionally, the activity detector circuitry has provided acceptable performance because such circuitry was physically separated from the power-controlled units by only a short distance. However, bus architectures are moving away from FSB architectures and are beginning to utilize point-to-point (pTp) architectures. However, pTp architectures will likely experience difficulties in power management.

One reason for experiencing such difficulties is that pTp architectures are distributed systems that support implementations where the power management circuitry and the power-controlled units are placed on different integrated circuits, but are connected by pTp links. As a result, conventional activity detector circuitry cannot effectively hide the latency to turn on/off the units from the performance aspects of the system since it cannot provide adequate lead time to circuitry of these units to turn power on or off.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The present application is related to and may incorporate embodiments from two previously filed applications. Both of the previously filed applications were filed on Jun. 29, 2006 by the same set of inventors. The first application, is titled "Method and Apparatus for Dynamically Controlling Power Management in a Distributed System", Ser. No. 11/479,438. The second application, is titled "Method and Apparatus to Dynamically Adjust Resource Power Usage in a Distributed System", Ser. No. 11/479,009.

Figure 1:
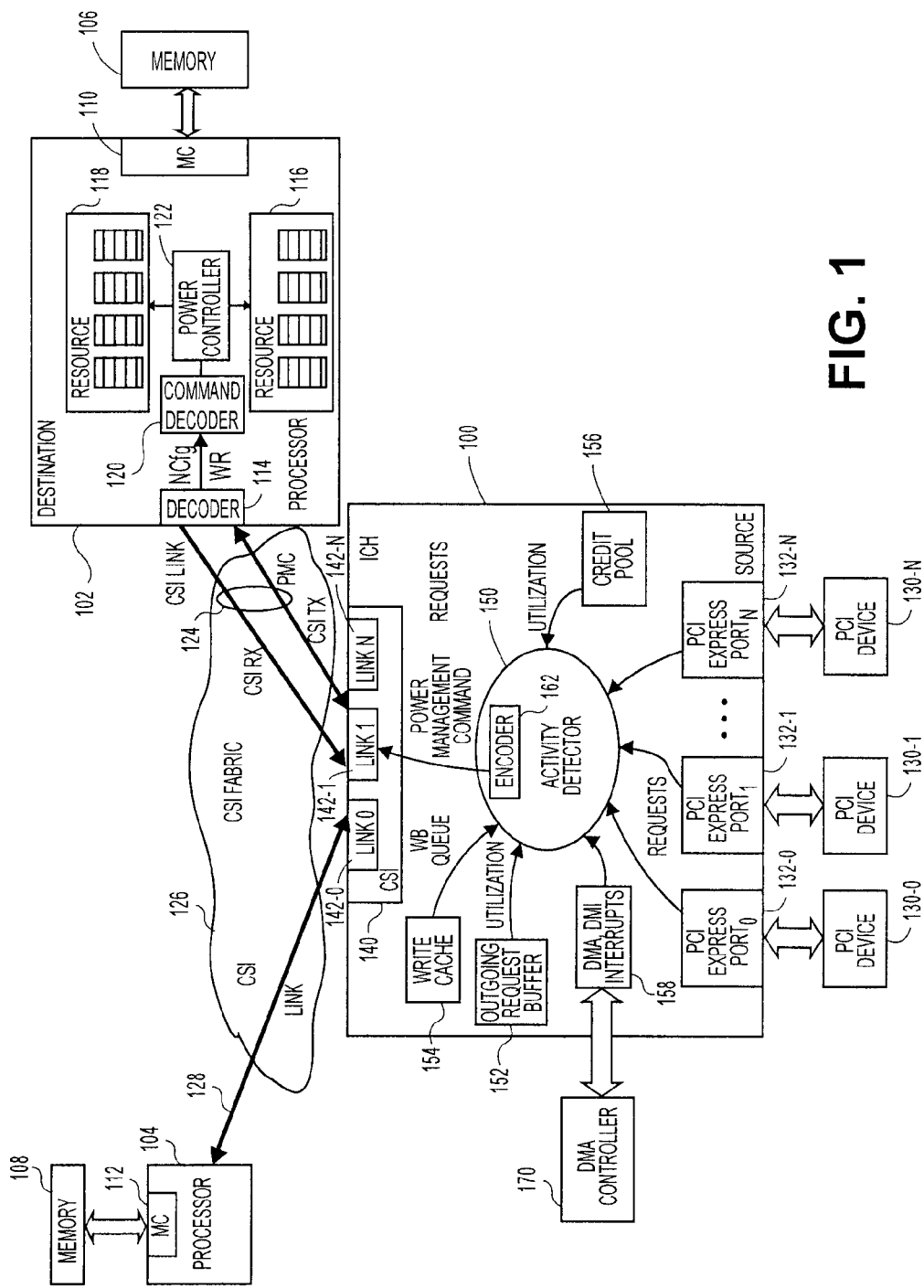
FIG. 1 is a block diagram of a dual processor system of one embodiment of the invention.

FIG. 1 is a block diagram of a dual processor system of one embodiment of the invention. Such a dual processor (DP) embodiment and may occur in a variety of possible platforms. For example, this embodiment may be implemented as a desk top or mobile computer, a server, a set top box, a personal digital assistant (PDA), an alphanumeric pager, cellular telephone, or any other type of wireless communication device.

In this embodiment, two destinations (processor 102 and processor 104) are communicatively coupled to a source. In this example, input/output hub (IOH) 100 by point-to-point links 124, 128. A "link" is generally defined as an information-carrying medium that establishes a communication pathway for messages, namely information placed in a predetermined format. The link may be a wired physical medium (e.g., a bus, one or more electrical wires, trace, cable, etc.) or a wireless medium (e.g., air in combination with wireless signaling technology).

In some embodiments, point-to-point links may be used, such as, not limited to PCI, PCIX, PCIe, etc. . . . Processor 102 and processor 104 may be substantially identical and include memory controllers 110, 112 respectively which communicate with memories 106 and 108 respectively. Accordingly, the remaining discussion of this embodiment is conducted in the context of processor 102. However, this discussion applies equally to other destinations in the system, such as processor 104. Moreover, it is envisioned that some systems may have more or fewer destinations used by a source.

In addition to memory controller 110, processor 102 includes certain resources 116 and 118 which may be allocated to a particular source such as IOH 100. For purpose of this discussion, it is to be assumed that resource 116 and resource 118 are not shared, but are uniquely allocated to IOH 100. In some embodiments, e.g., resource 116 may represent the portion of a layer resource that is uniquely allocated to the source. Resource 116 and 118 may be, for example, buffers required for memory access or they may be some sort of execution component in the destination. Resource 116 and 118 may be further subdivided into segments (alternatively referred to as chunks) 172-1 through 172-4 and 174-1 through 174-4 respectively. Each segment is defined to be individually power manageable, such that the segment may have its powered turned on or off such that the power consumed by the resource may be varied with greater granularity.

The granularity at which power may be managed can significantly impact the efficiency and power saving of a source controlled dynamic power (SCDPM) scheme. In many cases, if the only option is having the resource completely on or completely off, it will negatively impact the possible benefit of the scheme. For example, if a resource is used to a small degree almost continually with large periodic bursts of activity, little or no power saving is possible if the only options are completely on or completely off. In some embodiments, it is not necessarily the case that all segments be the same size or have the same power consumption.

In the context of an execution component resource, the notion of segmentation may be more logical than physical. For example, the execution component may have a number of discrete power levels at which it can be operated resulting in a change in, e.g., quality of service, execution speed, etc. In this context, the segments are representations of the different possible power levels.

A dominate premise of SCDPM is that the source of resource usage is better positioned to know how much of the resource is likely to be needed than the destination that holds the resource. The IOH 100 is a particularly desirable to use in SCDPM due to the relatively high latency characteristics of IOH devices which allows more time from when requests are made to when data actually appears, the large amount of concurrent data streaming data (such as DMA) and a lack of an all purpose cache in the IOH.

The activity detector 150 will be discussed further in connection with FIG. 3.

For example, activity detector 150 monitors requests or events coming from peripheral component interconnect (PCI) express port 132-0 through 132-N (collectively 132). Requests an event coming from PCI express ports 132 provide the activity detector an indication of likely future use based on the type of request or event and the destination identifier associated with that request or event PCI express ports 132 are connected to PCI express devices 130-0 through 130-N (collectively 130). PCI express devices may include hard discs or any other PCI device. As used herein "device" refers to any electrical component coupled to a link. A direct memory access (DMA) controller 170 is coupled to the IOH 100 to allow DMA transactions and supports legacy bridges and other peripheral devices. The DMA controls 170 sends interrupts to the IOH 100, activity detector may monitor these interrupts and similar to PCI request gains knowledge of expected future resource usage at destination coupled to the source.

Outgoing requests buffer 152 in IOH 100 is internal logic that tracks all transactions issued on the CSI bus. By monitoring the outgoing request buffer 152, the activity detector 150 can gain early knowledge of a future data stream where, for example, a destination is about to access IOH 100 to read or write a large amount of data. Write cache 154 contains data written from the various I/O devices waiting to go to main memory of a destination. During write back (WB) the requests are queued to send the data to the destinations. By monitoring the queue, activity detector 150 can estimate the traffic that will be caused in each destination by the pending write backs. The size of the write back queue and the rate of write back influences the time window over which activity detector 150 is able to predict usage from monitoring the write back queue.

Finally, the activity detector may monitor the credit pool 156. The credit pool 156 primarily gives an indication of current usage by the destinations. Current usage is not necessarily a good predictor of future usage, but the current usage may indicate inadequate power at one destination for the resources used. In that case, the activity detector may send an emergency power up message to that destination. While numerous components of the IOH 100 have been described as suitable for monitoring and providing hints to the activity detector of future usage it is within the scope and contemplation of embodiments of the invention that other components may also provide useful information of the activity detector to predict future resource usage.

Even in light of the large amount of information available to the activity detector, the activity detector should be designed such that the usage prediction is time accurate enough to minimize resource contention. For example, if the IOH 100 is preparing to write stream of data to a destination (e.g., processor 102) activity detector 150 needs to detect the request, make a decision and send a power up command to the destination in time for the destination to adjust the resource powering prior to arrival of the written data stream. Additionally, activity detector should avoid flooding the destination with power management messages as these consume bandwidth on the point-to-point link and may cause a latency increase in the destination logic as it performs the power adjustments.

Figure 2:
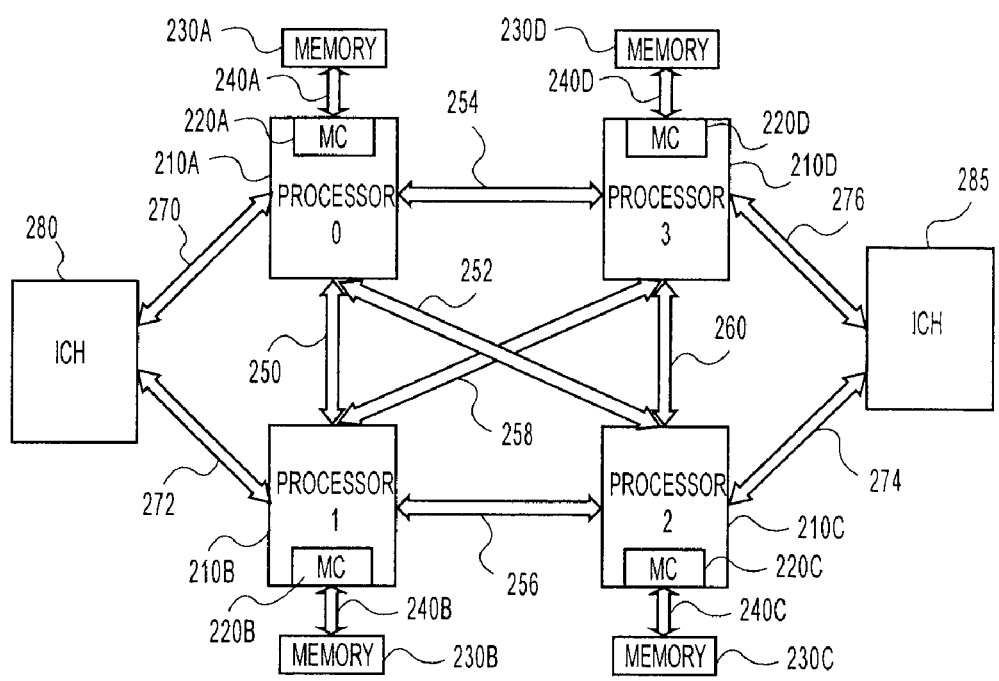
FIG. 2 is a block diagram of a multi-processor system of one embodiment of the invention.

Referring now to FIG. 2, an exemplary block diagram of a multiprocessor (MP) system 200 in accordance with one embodiment of the invention is shown. Similarly, MP system 200 may be a desktop or mobile computer, a server, a set-top box, personal digital assistant (PDA), alphanumeric pager, cellular telephone, or any other type of wired or wireless communication devices.

Herein, according to one embodiment of the invention, MP system 200 comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively. In one embodiment, the processors and IOH's are substantially identical to those described above with reference to FIG. 1.

Additionally, processor 210A is coupled to each of the other processors 210B-210D via point-to-point links 250, 252 and 254. Similarly, processor 210B is coupled to processors 210A, 210C and 210D via pTp links 250, 256 and 258. Processor 210C is coupled to processors 210A, 210B and 210D via pTp links 252, 256 and 260. Processor 210D is coupled to processors 210A, 210B and 210C via pTp links 254, 258 and 260. Processors 210A and 210B are coupled via point-to-point links 270 and 272 to a first input/output hub (IOH) 280 while processors 210C and 210D are coupled via point-to-point links 274 and 276 to a second IOH 285. In instances where there is not a direct point-to-point connection, the intervening device, e.g., processor is provided with pass through logic to pass through commands from; e.g., IOH 280 to processors 210C and 210D. This allows IOH 280 to power manage a resource in those processors 210C and 210D that are dedicated to IOH 280.

Figure 3:
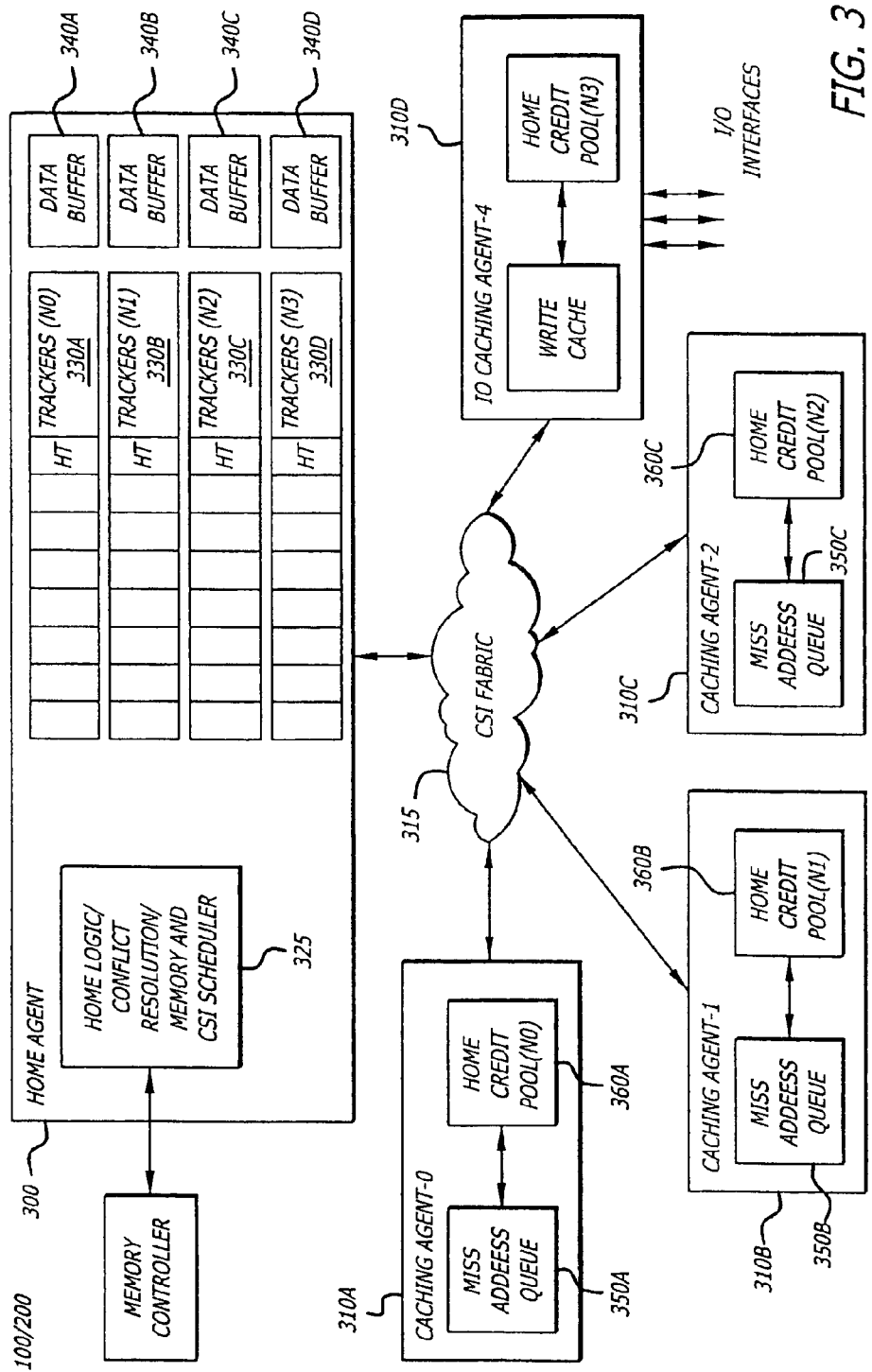
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D (or processor 150) is configured as a destination device 300, such as a home agent for example. Processors 210A-210C (or processor 110) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a CSI fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers $330_1 \ldots 330_M$, where $M \geq 1$. In combination with trackers $330_1 \ldots 330_M$, home logic 325 is adapted to operate as a scheduler to assist in the data transfer of incoming information from memory 230A of FIG. 2 and outgoing information to CSI fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where Ni≧1 (i=1,2,3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto CSI fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Similar to the caching agents 310A-310C, caching agent 310D comprises a credit counter 360D that maintains a count value representative of the number of unused tracker entries within tracker 330D. At reset, credit counter 360D is initialized to a pool size equal to the number of tracker entries (N3) associated with tracker 330D.

The number of tracker entries (N0, N1, etc.) has been designed to handle bursty traffic scenarios, and thus, has been sized for sustaining the peak bandwidth. In other words, potential burstiness and long latencies cause home agent 300 to allocate a pessimistic amount of resources for caching agents 310A-310D (requesting agents). As an example, from home agent 300 to caching agent 310A, in the event that the peak data bandwidth is $X_A$ gigabytes per second (GBps) and the latency of a transaction from the time it is issued from caching agent 310A to home agent 300 to the time the completion returns to caching agent 310A is $L_A$ nanoseconds (ns), the size (N0) of trackers is given by $(X_A*L_A)/64$, presuming each tracker entry is 64 bytes in size.

Typically, the latency from (I/O) caching agent 310D is almost 1.5× times that of the processor caching agents 310A-310C. This is because the pipeline for caching agent 310D starts closer to the I/O interface logic, and typically, I/O device clock speeds are 5 times slower than that of processors. Table 1 demonstrates potential latency, peak data bandwidth, and the number of tracker entries for a DP system.

TABLE 1

| Caching Agent | Latency (ns) | Peak BW (Gbps) | Tracker Entries |
|---|---|---|---|
| Local caching agent | 100 | 12.8 | 20 |
| Remote caching agent | 135 | 12.8 | 27 |
| IOH caching agent | 175 | 12.8 | 35 |

Typically, the number of tracker entries (Ni) is chosen as a multiple of 2, 4 or 8, and hence, the sizes selected for the trackers would be 20, 28 and 36, respectively. A large number of tracker entries and buffers can require a significant amount of power usage, so that such architecture is not optimal.

Secondly, in most operating conditions, the traffic throughout a system is quite bursty and does not stay at a peak bandwidth for long periods of time. Rarely, the full number of allocated tracker entries is used. Therefore, power usage can be optimized by modulating the number of active tracker entries based on activity, where caching agents (sources) are empowered to dynamically manage required resources at a home agent (destination) through use of a messaging scheme. This messaging scheme is referred to as source controlled dynamic power management (SCDPM) as described below.

Figure 4:
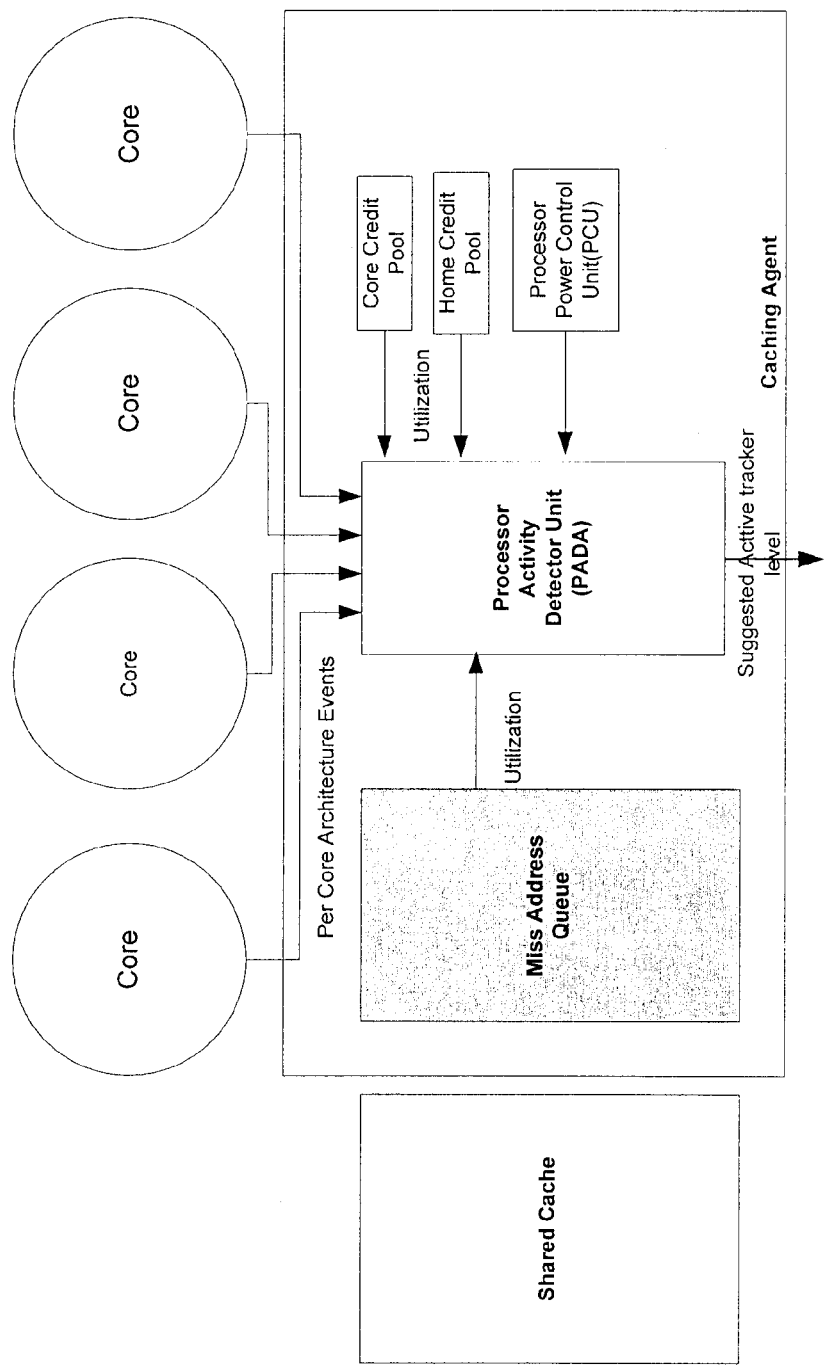
FIG. 4 is a block diagram of a core activity detector utilized in a dual processor or multi-processor system of one embodiment of the invention.

FIG. 4 is a block diagram of a core activity detector utilized in a dual processor or multi-processor system of one embodiment of the invention. In one embodiment, the core activity detector circuitry resides in a caching agent. In this embodiment, the caching agent is connected to several cores and a shared cache. For example, each processor consists of multiple cores and a large shared cache with associated caching agent logic that handles system coherency and request to memory subsystem. In FIG. 4, Processor activity detector unit (PADA) is connected to several functional units in the processor in order to obtain useful information. In this example, the PADA block is connected to per core architecture event bus (traces from each core to PADA; an utilization indication from miss address queue(which may consume home agent resource), a Processor Power Control Unit(PCU) which controls the entire processor's power state, and a credit usage indicator from home and core(s). Based on these inputs, PADA generate explicit messages using SCDPM interface that communicate to Home(destination) agent for proper power tuning. In one embodiment, the SCDPM interface is discussed in the related applications The following table depicts a plurality of architecture event counters. In one embodiment, the behavior of one or more of the processor cores are application specific. In this embodiment, some or all of the following architecture event counters are used by the activity detector that effectively represents the current core status and set and define power states.

| Architectural Events | Count threshold | Count threshold | Count threshold | Count threshold | Count threshold | Count threshold |
|---|---|---|---|---|---|---|
| Inst. Retired | X | X | X | X | X | High |
| Prefetch counts | low | high | X | X | X | X |
| LLC Miss | low | low | high | X | X | X |
| TLB Miss | X | X | X | X | high | X |
| Branch Miss | low | X | X | high | X | X |
| Final Decision to Home | Power Down | Power Up | Power UP | Power UP | Power Up | Power UP |

In one embodiment, the architecture Event counters are used to can predicting burstiness behavior. For example, one core may have a plethora experience lots of branch misprediction or lots of page misses can be a good indication of upcoming streams of memory requests. There are also other architecture events known to help understand application behavior that can be captured and provide insight to activity detector for application behavior. For example, a high count in LLC miss would suggest that we need more resource on home agent. In Table 1, we suggest the home agent resource level be based at least in part on several architectural event counters. However, the claimed subject matter is not limited to the embodiment of utilizing the same number of counters. For example, some of these counters are per core based and a package wise decision can be made by looking at accumulative results. One skilled in the art appreciates utilizing a different subset of counters based on package type, number of cores, etc.

Another input to the PADA is Core Credits/request queue utilization. For example, the core credit consumption and its request queue utilization may be used for understanding current core behavior. For example, one situation is when the core issues only a few requests to the caching agent. Therefore, this indicates efficient execution. Otherwise, a core that utilizes most of all of the respective core credit indicates generation of memory requests. Consequently, the home agent needs to be powered up to sustain the core requests.

Another input to the PADA is the home credit pool. For example, home credit indicates the number of entries that are currently consumed by the respective caching agent. Therefore, this might be a good indication to power down destination tracker entries if free credits counts are consistently high for a predetermined amount of time.

Another input to the PADA is Miss Address Queue Utilization. For example, miss address queue utilization is another indication whether the core is experiencing a plethora of cache misses and is requesting memory request to the home agent. In one embodiment, both home credit pool and miss address queue utilization can be used for threshold mechanism to determine proper power state of the home agents.

Another input to the PADA is Power State of the cores. In one embodiment, the PCU sends the power state of the cores to the PADA. The per core power state may be very useful information for the activity detector. For example, core(s) in higher P state or in C state generate low or zero number of requests to the caching agent. Consequently, one can determine or even predict the usage ability of home tracker entries. For example, a core that has been selected in turbo mode is a good indication of more requests coming from this particular core. While a core just entered C state indicate that the core will not generate any new requests anytime soon. Furthermore, if all cores have entered C state, it's clear a message can be sent to power down the home tracker associated with this caching agent.

Figure 5:
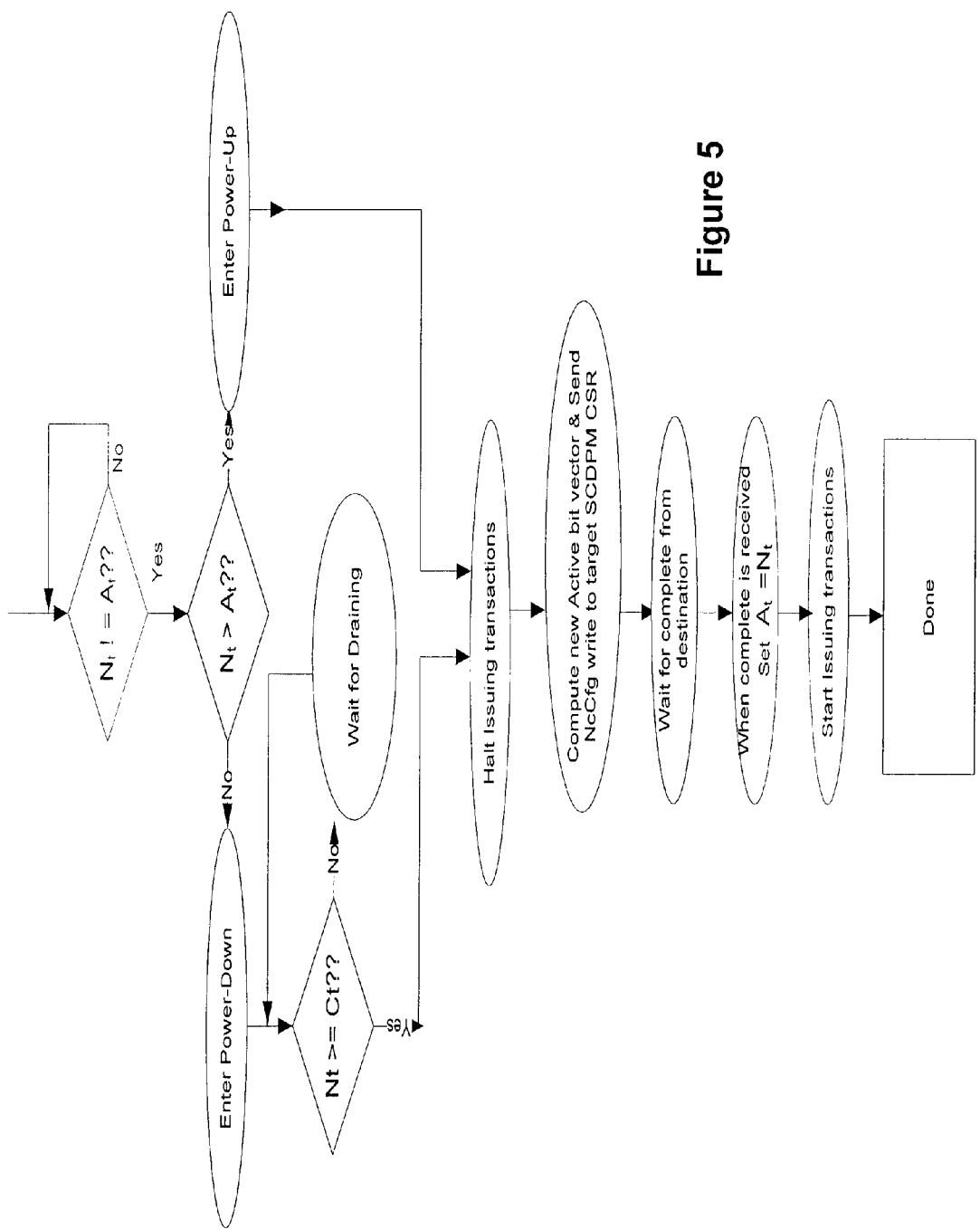
FIG. 5 is a method for a flowchart for source logic for one embodiment of the invention.

FIG. 5 is a method for a flowchart for source logic for one embodiment of the invention. In this flowchart, the PADA logic implementation is described to facilitate a level up or down of Nt levels per timer level. In one embodiment, the number of Nt levels is user defined. For example, N0 represents the state that all resources in the destination home are totally shut down. In contrast, Nmax suggested that all destination home resource are powered up. Therefore, PADA logic in each timer interval, suggested a level up or down of Nt levels. SCDPM will then use such information to power up/down the home agent resource, using the suggested flow depicted in FIG. 5. In this embodiment, the At denotes the current active tracker level at the destination and Ct denotes the current tracker usage at the destination.

Figure 6:
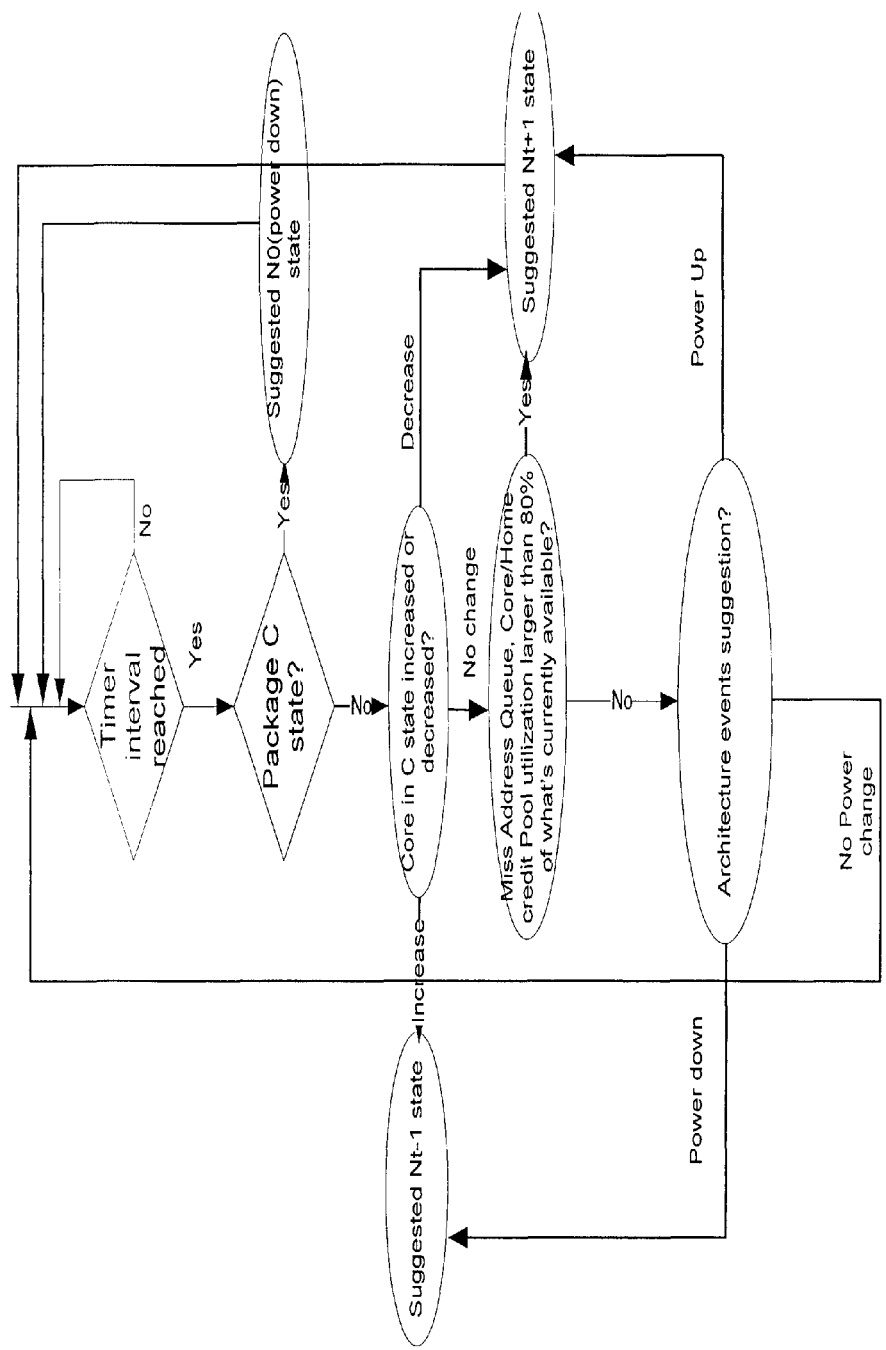
FIG. 6 is a method for a flowchart for a decision tree for the core activity detector for one embodiment of the invention.

FIG. 6 is a method for a flowchart for a decision tree for the core activity detector for one embodiment of the invention. In one embodiment, the method depicts a decision tree for PADA architecture. For example, the flowchart depicts a priority scheme of all information received by processor activity detector. Consequently, it determines the proper active level of the home agent(Nt). For example, in one embodiment, power state information of the processor package take precedence of all other information. Therefore, if processor package is in C state, there will be no traffic going to home agent. If package is active, PADA compares to see if more or less cores have entered power saving mode. More cores in C state suggested that home resource usage may drop. Lastly, Queue/credit utilization and architecture events will be used to tune activity level of the destination.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a processor core activity detector to receive a set of inputs relating to:
architecture event counters for a plurality of processor cores,
a power state of the plurality of processor cores,
a home credit pool for the number of entries consumed by a caching agent;
a miss address queue utilization, and
a core credit utilization indicator;
the processor core activity detector to determine an active level of a home agent based at least in part on the set of inputs.

2. The apparatus of claim 1 wherein the processor core activity detector resides in the caching agent.

3. The apparatus of claim 1 wherein core credit utilization indicator determines whether a home agent needs to be powered up due to a particular processor core generating memory requests, utilizing most or all of the core credit, that exceeds a predetermined threshold.

4. The apparatus of claim 1 wherein the architecture event counters are used to facilitate prediction of burst operations, such that a processor core with a large number of branch mispredictions or page misses indicates the likelihood of a plethora of imminent memory requests.

5. The apparatus of claim 1 wherein the architecture event counters correspond to prefetch counts, LLC misses, TLB misses, and Branch misses.

6. A caching agent, coupled to a home agent and a plurality of processor cores comprising:
a processor power control unit (PCU) to control a power state of the plurality of processor cores, a first logic to store a home credit pool for the number of entries consumed by the caching agent;

a miss address queue, and a second logic to store a core credit utilization indicator;

the processor core activity detector to determine an active level of the home agent based at least in part inputs received from the PCU, first and second logic, architecture event counters received from the plurality of processor cores, and the miss address queue.

7. The caching agent of claim 6 wherein core credit utilization indicator determines whether a home agent needs to be powered up due to a particular processor core generating memory requests, utilizing most or all of the core credit, that exceeds a predetermined threshold.

8. The caching agent of claim 6 wherein the architecture event counters are used to facilitate prediction of burst operations, such that a processor core with a large number of branch mispredictions or page misses indicates the likelihood of a plethora of imminent memory requests.

9. The caching agent of claim 6 wherein the architecture event counters correspond to prefetch counts, LLC misses, TLB misses, and Branch misses.

10. A method of determining a power active level for a home agent, coupled to a plurality of processor cores in an integrated device package comprising:

determining whether a power state of the integrated device package is in a power down condition, otherwise, determining whether the number of processor cores that have entered a power saving state has changed from a prior time interval;

comparing a credit pool and a miss address queue utilization to a first threshold;

comparing a plurality of architecture event counters to a second threshold; and adjusting the power active level based at least in part on the comparison results.

11. The method of claim 10 wherein the power active level of the home agent is increased when the number of processor cores that have entered a power saving state has decreased from the prior time interval.

12. The method of claim 10 wherein the power active level of the home agent is decreased when the number of processor cores that have entered a power saving state has increased from the prior time interval.

13. The method of claim 10 wherein the power active level of the home agent is increased when the credit pool and a miss address queue utilization exceeds the first threshold.

14. The method of claim 10 wherein the plurality of architecture event counters are compared to a second threshold if the credit pool and a miss address queue utilization does not exceed the first threshold.

15. A system comprising:

a server platform having a plurality of processors each processor having at least one resource;

an core activity detector to define a power active level of a home agent based at least in part on: a power state of the plurality of processors, a miss address queue utilization counter, a core credit utilization indicator, and architecture event counters associated with the plurality of processors.

16. The system of claim 14 further comprising:

a peripheral component interconnect device coupled to an IOH.

17. The system of claim 14 wherein each processor comprises:

a power controller to respond to the power management command by changing a power state of the resource.

18. The system of claim 16 wherein the resource is dedicated to the IOH and wherein the resource is logically organized into separately power manageable segments.

19. The system of claim 14 wherein the activity detector is to monitor at least one of an outgoing request queue, a writeback cache, and a credit pool as at least a partial basis for the predicted future usage of the resource.

* * * * *